No. 890,025. PATENTED JUNE 9, 1908.
W. A. COATES.
NOSE PIECE FOR EYEGLASSES AND SPECTACLES.
APPLICATION FILED JUNE 22, 1907.
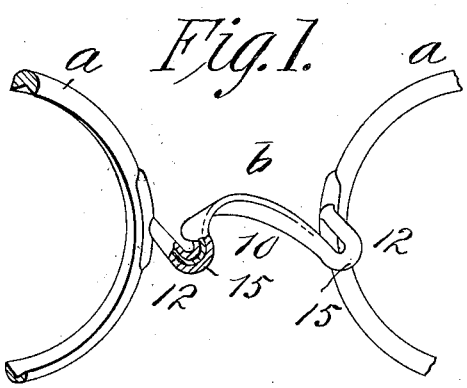
  
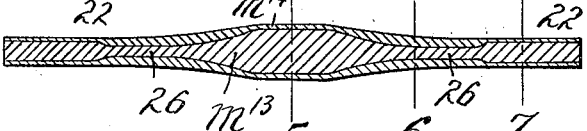
  
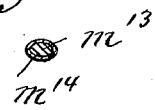
Witnesses:
H. L. Sprague
R. M. Mowry
Inventor,
Walter A. Coates,
by
Attorney.

UNITED STATES PATENT OFFICE.

WALTER A. COATES, OF PROVIDENCE, RHODE ISLAND.

NOSE-PIECE FOR EYEGLASSES AND SPECTACLES.

No. 890,025.　　　Specification of Letters Patent.　　　Patented June 9, 1908.

Application filed June 22, 1907. Serial No. 380,279.

*To all whom it may concern:*

Be it known that I, WALTER A. COATES, a citizen of the United States of America, and resident of Providence, in the county of Providence and State of Rhode Island, have invented certain new and useful Improvements in Nose-Pieces for Eyeglasses and Spectacles, of which the following is a full, clear, and exact description.

In gold filled spectacle and eye glass frames the small bar, or wire, used for the construction of the frame is of base metal having a rolled gold covering of a thickness commonly only approximately one tenth of the diameter of the wire, and after comparatively short usage of the eye glass the thin gold coverings at the return bent portions at the opposite extremities of the nose piece or bridge become worn away, exposing the base metal, or are penetrated by perspiration, and acids thereof, causing corrosion which is observable not only at the return bent portions of the nose piece which are worn or penetrated as stated, but even at portions of the frame remote therefrom, thus rendering the eye glass undesirable for use, and making it incumbent in many cases for the seller or the manufacturer, dealing under a guarantee, to replace, with loss, the defective eye glass.

This invention consists in a spectacle or eye glass frame which comprises a nose piece or bridge having return bent extremities adjacent and connected with the lens frames, all made from a filled gold bar or wire whereby the nose piece has gold coverings of increased thickness at and adjacent the aforesaid return bent portions and so that the eye glass may be constantly used for many years, retaining for all such time the appearance of one having a solid gold frame.

The construction of the nose piece is disclosed in the accompanying drawings, and the following description; and in said drawings,—Figure 1 is a perspective view of portions of two lens frames and the uniting nose piece. Fig. 2 is a partial edge view of the same, the return bent portions of the nose piece having the thicker gold coverings being in section. Fig. 3 is a central longitudinal sectional view of a gold covered core or bar and thickening gold sections on the proper portions of such bar preparatory to swaging to produce the blank or bar appropriate for the formation of the improved nose piece. Fig. 4 is a central longitudinal section of the same parts united and swaged to tapered form. Figs. 5, 6 and 7 are cross sections of the bar from which the nose piece is constituted, as taken respectively on the lines 5—5, 6—6, and 7—7, on Fig. 4. Fig. 8 is a cross section taken on line 8—8, Fig. 3. Fig. 9 is a similar cross sectional view showing slight modification in the form of the gold ferrule or band. Fig. 10 is a view like Fig. 6 but showing the cross sectional formation of the completed part where the band of the form represented in Fig. 9 is employed.

In the drawings,—$a$ $a$ represent portions of the lens frames of a spectacle or eye glass, said frames being united by the nose piece $b$ having a bowed intermediate portion 10 and return bent extremities 12, 12, at the opposite ends of the bowed part 10, the whole being composed of a flattened wire having a base metal core 13 and a generally thin core-covering and inclosing layer 14, which layer at the return bend, and as represented at 15, is very much thicker than at other portions along the length of the nose piece.

By describing the method of manufacture of the nose piece in conjunction with the drawings, the novel structural characteristics of such piece and the practicability of its production will be rendered more fully apparent.

In making the nose-piece, I first provide a wire blank $m$ consisting of a body or core $m^{13}$ of base metal, and a very thin covering layer $m^{14}$ of gold,— said blank round in cross section having a comparatively thick middle portion 20 and reduced extremities 22, 22; and the shoulders 23 at the junction of the parts 22, 22, with the intermediate part 20 are beveled. I next fit and unite two pure gold cross sectionally circular, or C-shaped, ferrules or bands $o$ $o$ on the portions 22, 22, of the blank $m$ in endwise contact against the shoulders 23, using gold solder in this operation. In Fig. 8 the cross sectionally circular ferrule is shown, while in Fig. 9 a partially circular band is shown. The gold ferrules or bands $o$ are of an external diameter about equal to that of the thicker middle portion 20 of the wire blank $m$, and the end of each ferrule, to match with the beveled shoulder 23, is made with a flaring mouth while its opposite end is externally beveled, as represented at 25. These parts $m$ and $o$ $o$ being solidly united, the composite blank is swaged by the use of suitable swaging rolls or dies whereby to assume the structural character represented in Fig. 4, in which it is seen that the middle portion 20 of the blank remains in its original form as do, also, its very end portions, but the ferrules o o are elongated and while to some extent they are tapered towards their outer ends, they serve more particularly in the swaging action to increase the attenuation,—as represented at 26, 26, Fig. 4,—of the parts of the base-metal core within the blank extremities 22, 22, between the thick middle portion and their very ends,—this attenuation of the core resulting, in the swaging action, because it is of softer quality than that of the gold bands in pressure thereagainst. In this swaging process the gold of which the ferrules are composed merges without imperceptible joint, seam or other indication of juncture to form a continuous surface, and as one with the gold covering $m^{14}$ of the blank m both at its middle portion 20 and near its opposite ends.

In the swaging by the dies, the bar is brought to oblated cross sectional form, as represented by Figs. 5, 6 and 7, and the bar is then bent to the usual nose piece form either by hand or by the employment of tools of a simple character, as usual.

The ferrules or bands of the pure gold need not necessarily encircle the gold covered wire at the two portions thereof at either side of the middle portion, but by being of C form in cross section to partially encircle the wire at the stated portions, and at the sides thereof which make the exposed return bent parts of the nose piece the utmost economy of the high cost metal is acquired with no detriment to the practical value and durability of the nose-piece.

The process, of making the nose piece, of which description has hereinabove been incidentally given, forms the subject matter of application for patent filed by me March 9th, 1906, Serial No. 305,170.

I claim:—

1. A nose piece of U-form consisting of a core of base metal constructed to have a comparatively thick middle portion and reduced extremities forming shoulders at their juncture with said middle portion, said shoulders being beveled, and a gold covering for said core which incloses the middle part and its extremities, said covering engaging said shoulders.

2. A nose piece of U-form consisting of a core of base metal constructed to have a comparatively thick middle portion and end portions of less diameter than the middle portion, thin connecting portions between the middle and end portions forming shoulders in conjunction with each of the latter, and a gold covering which incloses all of said portions and engages said shoulders.

3. A nose piece of U-form embodying a core constructed to have a thick middle portion and reduced parts on opposite sides thereof which form shoulders in conjunction with the middle portion, and a gold covering for said core having portions engaging said shoulders, said covering being of greatest thickness at points surrounding said reduced parts.

Signed by me at Springfield, Mass., in presence of two subscribing witnesses.

WALTER A. COATES.

Witnesses:
 WM. S. BELLOWS,
 G. R. DRISCOLL.